United States Patent Office 2,806,798
Patented Sept. 17, 1957

2,806,798
PROCESS FOR PREPARING YELLOW COLLOIDAL SILVER

Clay Weaver, Wilmington, Del., assignor to E. I. du Pont de Nemours and Company, Wilmington, Del., a corporation of Delaware No Drawing. Application July 8, 1953,
Serial No. 366,877

9 Claims. (Cl. 106—1)

This invention relates to the preparation of colloidal silver. More particularly it relates to the preparation of colloidal silver in water-permeable protective colloids. Still more particularly it relates to a process of preparing yellow colloidal silver sols in water-permeable colloids suitable for use as a blue light-absorbing layer in multilayer color films.

Colloidal silver sols have long been known and occur in a wide range of colors including yellow, brown, green, blue, purple, and black. These are usually prepared by reduction of a solution of soluble silver salts containing silver ions. The yellow sols are especially desirable as blue light-absorbing filters for use in multilayer color films since they are irreversibly and completely removed during normal color processing. To be completely satisfactory for this use they must be photographically inert, absorb strongly in the region of 400 and 480 m$\mu$ and transmit almost completely at wave lengths above 500 m$\mu$. This type of sol is the most difficult to prepare. It is composed of the smallest size particles and under most of the conditions previously reported it tends to be converted spontaneously to brown, purple or black sols. The prior art methods generally use silver nitrate and silver oxide solutions, and these solutions, which have a high concentration of silver ions, are reduced with organic and inorganic reducing agents, both in the presence or absence of protective colloids. These methods have the disadvantage that the resulting sols are of poor spectral qualities or are not photographically inert and when coated adjacent to or incorporated with a photographic silver halide colloid emulsion layer cause both fog and desensitization.

It has been found that yellow colloidal silver sols having extremely fine particle sizes, excellent blue light-absorption, and no significant fogging or desensitizing action on silver halide emulsions can be prepared by reducing a silver bromide sol in the presence of a protective colloid with a reducing agent having a reduction potential of at least 0.3. The resulting silver sol is then freed of soluble inorganic salts, etc. by coagulating the protective colloid and washing the gel or coagulated product.

In carrying out the invention the silver bromide sol may be prepared either by adding a dilute solution of silver nitrate in an aqueous colloid solution to a dilute solution of a soluble inorganic bromide in an aqueous colloid solution or by the reverse procedure; the inorganic bromide being used in slight excess. After formation of the silver bromide sol and before any significant crystal growth occurs the pH is adjusted by the addition of a dilute alkali to 8.5 to 9.5 and an aqueous solution of a strong reducing agent, e. g., hydrazine hydrate, is added. These latter ingredients can be added stepwise or simultaneously or from a single solution.

The silver bromide sol preferably is prepared at about room temperature. A suitable temperature range is from 60° F. to 90° F. The reduction step may be carried out at room temperature but is expedited if the solution is heated to a moderate temperature, e. g., 100° F. to 200° F. for 15 to 30 minutes. A stabilizing agent, e. g., cationic surface-active wetting agent, a polyglycol or glycerine, preferably the latter, may be present during the reduction step and is particularly useful with polyvinyl alcohol, hydrophilic polyvinyl esters and acetals.

The silver bromide concentration in the sol to be reduced should be kept relatively low, e. g., below 2% by weight, a practical range being from 0.1% to 2% and a preferred range being 0.3% to 0.8%. The amount of protective colloid in the aqueous solution, in general, should be between 2 and 20% and preferably between 3 and 8% by weight of the water.

The invention will be further illustrated but is not intended to be limited by the following examples in which the parts stated are by weight unless otherwise indicated.

*Example I*

A solution of 25 parts of 0.8 N silver nitrate in 100 parts of 4% aqueous gelatin solution is added to a solution of 25 parts of 0.88 N ammonium bromide in 600 parts of 4% aqueous gelatin at 80° F. To the resulting silver bromide sol is added first 10 parts of 1 N sodium hydroxide and then 30 parts of hydrazine hydrate solution prepared by diluting 85% aqueous hydrazine hydrate 1 to 5 parts by volume with water. The mixture is heated to 140° F. within 10 minutes and held at this temperature for 30 minutes, then set by cooling. The gel is pressed through a dye to form noodles which are washed thoroughly with water. After washing, the noodles are remelted and the viscosity is adjusted for the desired coating speed and temperature to give a coating having a density of 1.5 at 425 m$\mu$. The resulting coating has a density of less than 0.1 at 550 m$\mu$ and has no photographic action on a gelatin emulsion layer coated adjacent to it.

*Example II*

A solution consisting of 48 parts of 0.8 N silver nitrate and 100 parts of 10% aqueous polyvinyl alcohol (polyvinyl acetate, 88% hydrolyzed and having a 4% aqueous solution viscosity of 20–25 centipoises at 68° F.) is added to a solution of 48 parts of 0.88 N ammonium bromide in 400 parts of 10% aqueous polyvinyl alcohol, of the same characteristics, at 80° F. To the resulting silver bromide sol is added 40 parts of 1 N sodium hydroxide and a solution consisting of 200 parts of 10% aqueous polyvinyl alcohol, of the same characteristics, and 90 parts of hydrazine hydrate prepared by diluting 85% aqueous hydrazine hydrate 1 to 5 parts by volume with water. The mixture is heated to 158° F. within 10 minutes and held at this temperature for 30 minutes. After cooling to 86° F. the mixture is coagulated by the slow addition of 1600 parts of acetone. After hardening in 800 parts of acetone for 10 minutes it is washed successively with a mixture of 800 parts of 95% aqueous ethanol, 250 parts of water and 50 parts of 28% aqueous ammonium hydroxide for 30 minutes and five 800 parts of ethanol. An aqueous solution of the product shows a maximum absorption at 416 m$\mu$. After adjusting the solution viscosity it is coated as the filter layer in a multilayer film of the types described in Jennings et al. 2,397,864 and Blanchard 2,551,091 for color development.

*Example III*

To a solution of 48 parts of 0.8 N silver nitrate and 700 parts 3% aqueous polyvinyl alcohol completely hydrolyzed and having a 4% solution viscosity of 45–55 centipoises at 68° F. is added a solution of 48 parts of 0.88 N ammonium bromide at 76° F. To the resulting silver bromide sol is added a mixture of 44 parts of glycerine, 20 parts of 1 N sodium hydroxide and 90 parts of a hydrazine hydrate solution prepared by diluting 85% aqueous hydrazine hydrate 1 to 5 parts by volume with water. The mixture is heated to 158° F. within 10 minutes and held at this temperature for 30 minutes. The mixture is cooled to 76° F., coagulated by the slow addition of 1600 parts of acetone, hardened in 800 parts of acetone and washed with water. The product is similar to that of Example II, but with slightly less green light absorption.

*Example IV*

To a solution of 48 parts 0.8 N silver nitrate and 700 parts of a 5% aqueous solution of a polyvinyl acetal containing 10% p-hydroxybenzaldehyde and 2% benzaldehyde-o-sodium sulfonate is added 48 parts of 0.88 N ammonium bromide at 76° F. To this mixture is added a mixture of 44 parts of glycerine, 20 parts 1 N sodium hydrazide and 90 parts of hydrazine hydrate prepared by diluting 85% aqueous hydrazine hydrate 1 to 5 parts by volume with water. The mixture is heated to 158° F. within 10 minutes and held at 158–167° F. for one-half hour. After cooling to 76° F. it is coagulated by slowly adding an equal volume of acetone, hardened in 800 parts of acetone and washed with water. The absorption characteristics of this product are comparable to the properties of the product described for Example III.

*Example V*

A solution of 48 parts of 0.8 N silver nitrate is added to a solution of 700 parts of 10% aqueous polyvinyl alcohol similar to that of Example III at 140° F. To the resulting solutions at 140° F. is added 48 parts of 0.88 N ammonium bromide and the sol is cooled to 95° F. A mixture consisting of 20 parts of 1 N sodium hydroxide, 40 parts of 10% cetyltrimethylammonium bromide and 90 parts of hydrazine hydrate solution, prepared by diluting 85% aqueous hydrazine hydrate 1 to 5 parts by volume with water, is added to the sol. The resulting mixture is heated to 158° F. within 10 minutes and is held at 158 to 167° F. for one hour. After cooling to 95° F. it is coagulated by adding 1600 parts of acetone, hardened in 800 parts of acetone and washed thoroughly with water. A water solution of the product exhibits a maximum at 414 m$\mu$. Coatings of this sol made after the manner described in Example II gave similar results.

*Example VI*

To a solution of 12 parts of 0.8 N silver nitrate in 175 parts of 5% aqueous polyvinyl alcohol similar to that of Example II is added 12 parts of 0.88 N ammonium bromide at 80° F. A mixture of 11 parts of polyethylene glycol having an average molecular weight of 200, 5 parts of 1 N sodium hydroxide and 23 parts of a hydrazine hydrate solution prepared by diluting 85% aqueous hydrazine hydrate 1 to 5 parts by volume with water is added to the resulting sol. The mixture is heated to 158° F. within 10 minutes and held at this temperature for one hour. After cooling to 76° F. the product is isolated in a manner similar to the one described for Example II. An aqueous solution of the product has a maximum absorption at 410 m$\mu$.

In place of the preferred reducing agent described in the foregoing examples, there can be substituted various other reducing agents. Among such agents are p-phenylenediamine, p-amino-N-dimethylaniline, p-amino-N-diethylaniline, p-aminophenol, p-methylaminophenol, hydroxylamine, hydroquinone, phenylhydrazine, and ferrous oxalate.

Various alkalies can be used to adjust the pH. Among the additional suitable ones are lithium, potassium and ammonium hydroxides, and ammonium, lithium, sodium, and potassium carbonates.

Various water-permeable colloids can be used in place of the specific ones described in the foregoing examples. Suitable additional ones include the water-soluble polymethacrylamides, polyacrylamides, the hydrolyzed poly(vinylacetate co ethylene) of McQueen U. S. Patent 2,397,866 and the polyvinyl acetals with aromatic and aliphatic aldehydes containing COOM and SO$_3$M groups where M is hydrogen or an alkali metal, described in Woodward U. S. Patent 2,462,151 and German Patent 643,650.

In place of the specific soluble bromide used in the foregoing examples one may substitute an equivalent amount of sodium or potassium bromide. Similarly, in place of the silver nitrate one may substitute another soluble silver salt, e. g., silver acetate, silver sulfate, silver sulfamate, or silver citrate. The soluble bromide should be present in excess over the soluble silver salt. A practical excess is 1% to 20% with 6 to 11% preferred.

While glycerine is a preferred stabilizing agent with vinyl alcohol polymer protective colloids, other suitable agents include diethylene glycol and poly(ethylene glycol) of molecular weights up to 200 and more, poly-(propylene glycol) of molecular weight up to 200 and more, poly(vinylpyrrolidone) and long chain alkyl quaternary ammonium chlorides, bromides, etc., wherein the long chain alkyl group contains 8 to 18 carbon atoms and the remaining alkyl groups contain 1 to 2 carbon atoms. Mixtures of two or more of such agents can be used.

The preparation of the silver bromide sol and its reduction to colloidal silver, as described in the examples, are carried out in aqueous solution. The solvent is not limited to water alone or other water-miscible solvents, e. g., methyl alcohol, ethyl alcohol, acetone, dioxane, diethyl ether, etc., and mixtures can be admixed in amounts up to 20% to control the solubility of the colloids.

The yellow colloidal silver obtained by practicing the processes of this invention is photographically inert, has an absorption maximum in the region of 400 to 450 m$\mu$ and transmits light above 500 m$\mu$. The yellow colloidal silver dispersions in water-permeable colloids are especially useful as the blue light-filter layer or stratum in a multilayer color film or paper. Filter layers or strata made from the dispersions have strong absorption of blue light and freely transmit green and red light.

The process gives uniform results from batch to batch and uses relatively inexpensive reducing agents in place of expensive materials such as diphenylcarbazide that have been required for preparing yellow colloidal silver from soluble silver compounds. Further, the simple reducing agents like hydrazine are decomposed during the reaction to such harmless compounds as ammonia, nitrogen and water.

An advantage of the invention is that it provides a simple and effective process for preparing yellow colloidal silver. Another advantage is that it provides a practical process of making stable yellow colloidal silver of excellent blue light absorbing properties. A further advantage is that the process does not require expensive apparatus or tedious processing steps. A still further advantage is that the colloidal silver does not affect the reactivity of the silver halides in light-sensitive layers.

What is claimed is:

1. A process for preparing yellow colloidal silver which transmits light of wavelength over 500 m$\mu$ and has an absorption maximum in the region from 400 to 450 m$\mu$ which comprises adding to an aqueous solution containing 2% to 20% by weight of a water-permeable colloid having protective colloid properties and a soluble silver salt, an aqueous solution containing 2% to 20% by weight of a water-permeable colloid having protective colloid properties and a soluble inorganic bromide between 1% and 20% by weight in excess of the silver salt which is present in an amount to form a concentration of silver bromide in said colloid of 0.1% to 2% by weight, admixing sufficient dilute alkali solution to the resulting sol to raise the pH to at least 8.5 and an aqueous solution containing in a stoichiometric excess a nitrogen-containing photographic developing agent having a reduction potential of at least 0.3, heating the admixture to 100° F. to 200° F. for a period of at least 10 minutes, coagulating the colloid dispersion, and washing the soluble salts from the coagulate.

2. A process for preparing yellow colloidal silver which transmits light of wavelength over 500 millimicrons and has an absorption maximum in the region from 400 to 450 millimicrons which comprises adding to an aqueous solution containing 2% to 20% by weight of a water-permeable colloid having protective colloid properties and a soluble silver salt, an aqueous solution containing 2% to 20% by weight of a vinyl alcohol polymer having a large number of recurring intralinear —$CH_2$—CHOH— groups, and a soluble silver salt, an aqueous solution containing 2% to 20% by weight of said polymer and a soluble inorganic bromide between 1% and 20% by weight in excess of the silver salt which is present in an amount to form a concentration of silver bromide in said polymer of 0.1% to 2.0% by weight, admixing sufficient dilute alkali solution to raise the pH to at least 8.5, a stabilizing agent comprising glycerine and an aqueous solution containing in a stoichiometric excess a nitrogen-containing photographic developing agent having a reduction potential of at least 0.3, heating the admixture to 100° F. to 200° F. for a period of at least 10 minutes, coagulating the polymer dispersion, and washing the soluble salts from the coagulate.

3. A process as set forth in claim 1 wherein said colloid is gelatin and said reducing agent is hydrazine hydrate.

4. A process for preparing yellow colloidal silver which transmits light of wave length over 500 millimicrons and has an absorption maximum in the region from 400 to 450 millimicrons which comprises reducing an aqueous colloidal dispersion of silver bromide in a water-permeable colloid having protective colloid properties completely to colloidal silver with an aqueous solution containing in a stoichiometric excess as a reducing agent a photographic developing agent having a reduction potential of at least 0.3.

5. A process for preparing yellow colloidal silver which transmits light of wave length over 500 millimicrons and has an absorption maximum in the region from 400 to 450 millimicrons which comprises reducing an aqueous colloidal dispersion of silver bromide in a water-permeable colloid having protective colloid properties completely to colloidal silver with an aqueous solution containing in a stoichiometric excess a nitrogen-containing photographic developing agent having a reduction potential of at least 0.3.

6. A process as set forth in claim 5 wherein said agent is hydrazine hydrate.

7. A process as set forth in claim 6 wherein said colloid is gelatin.

8. A process for preparing yellow colloidal silver which transmits light of wave length over 500 millimicrons and has an absorption maximum in the region from 400 to 450 millimicrons which comprises reducing an aqueous colloidal dispersion of silver bromide in a water-permeable colloid having protective colloid properties completely to colloidal silver with an aqueous solution containing in a stoichiometric excess as a reducing agent a photographic developing agent having a reduction potential of at least 0.3, coagulating the colloid and dispersed colloidal silver and washing the water-sensitive salts from the coagulate.

9. A process for preparing yellow colloidal silver which transmits light of wave length over 500 millimicrons and has an absorption maximum in the region from 400 to 450 millimicrons which comprises reducing an aqueous colloidal dispersion of silver bromide in a water-permeable colloid having protective colloid properties completely to colloidal silver with an aqueous solution containing in a stoichiometric excess a nitrogen-containing photographic developing agent having a reduction potential of at least 0.3, coagulating the colloid and dispersed colloidal silver and washing the water-sensitive salts from the coagulate.

References Cited in the file of this patent

UNITED STATES PATENTS

| 1,971,430 | Schneider | Aug. 28, 1934 |
| 2,592,870 | Dickenson et al. | Apr. 15, 1952 |
| 2,665,986 | Bott | Jan. 12, 1954 |

FOREIGN PATENTS

| 471,520 | Great Britain | Sept. 6, 1937 |

OTHER REFERENCES

Clerc: "Photography-Theory and Practice," published by Pittusn & Sons (1937), pp. 130 and 297–8 relied on.

Carroll et al.: Sensitization of Photographic Emulsions by Colloidal Materials, Bur. of Stds, Jn. of Research, vol 1, October 1928, pages 565–588, particularly pages 569–572 and 580–582.